(12) United States Patent
Emerson

(10) Patent No.: US 7,293,102 B2
(45) Date of Patent: Nov. 6, 2007

(54) METHOD AND APPARATUS FOR STORING DATA AND REPLAYING STORED DATA IN A TEMPORALLY ACCURATE MANNER

(75) Inventor: Theodore F. Emerson, Houston, TX (US)

(73) Assignee: Hewlett-Packard Development Company, Houston, TX (US)

( * ) Notice: Subject to any disclaimer, the term of this patent is extended or adjusted under 35 U.S.C. 154(b) by 1098 days.

(21) Appl. No.: 10/106,279

(22) Filed: Mar. 26, 2002

(65) Prior Publication Data
US 2003/0220999 A1    Nov. 27, 2003

(51) Int. Cl.
*G06F 15/16* (2006.01)
*G06F 15/173* (2006.01)

(52) U.S. Cl. .................. 709/232; 709/231; 709/233; 709/238

(58) Field of Classification Search ........ 709/231–233, 709/230, 246, 217, 218, 219, 238; 715/723
See application file for complete search history.

(56) References Cited

U.S. PATENT DOCUMENTS

| 5,442,390 | A | * | 8/1995 | Hooper et al. ................ 725/90 |
| 5,790,895 | A | | 8/1998 | Krontz et al. ................ 395/884 |
| 5,898,861 | A | | 4/1999 | Emerson et al. ............ 395/500 |
| 5,991,373 | A | * | 11/1999 | Pattison et al. .......... 379/93.17 |
| 6,043,845 | A | * | 3/2000 | Thompson ............. 375/240.01 |
| 6,173,340 | B1 | * | 1/2001 | Gready et al. ................. 710/6 |
| 6,233,634 | B1 | * | 5/2001 | Clark et al. .................. 710/313 |
| 6,411,623 | B1 | * | 6/2002 | DeGollado et al. ...... 370/395.1 |
| 6,571,050 | B1 | * | 5/2003 | Park ........................... 386/46 |
| 6,687,752 | B1 | * | 2/2004 | Falco et al. ................. 709/230 |
| 6,782,490 | B2 | * | 8/2004 | Maxemchuk et al. ......... 714/18 |
| 6,947,448 | B2 | * | 9/2005 | Tomita ....................... 370/471 |

OTHER PUBLICATIONS

"Compaq Remote System Management for Industry-Standard Servers," Compaq Computer Corporation Technology Brief, Sep. 2001.
"Remote Server Management with Integrated Remote Console," Compaq Computer Corporation Technology Brief, Oct. 21, 1996.

* cited by examiner

*Primary Examiner*—Abdullahi Salad
*Assistant Examiner*—Hussein A El-chanti

(57) ABSTRACT

The disclosed embodiments relate generally to monitoring and correcting failure conditions in networked computer systems and, more particularly, to improving the usefulness of stored video data retrieved for playback from a managed server. The disclosed embodiments include a method and apparatus for storing captured video data for retrieval and replay in a temporally accurate manner at a later time. The video data replayed in this manner is useful for identifying potential problems in the managed server.

20 Claims, 4 Drawing Sheets

METHOD AND APPARATUS FOR STORING DATA AND REPLAYING STORED DATA IN A TEMPORALLY ACCURATE MANNER

BACKGROUND OF THE INVENTION

1. Field of the Invention

This invention relates generally to monitoring and correcting failure conditions in networked computer systems and, more particularly, to improving the usefulness of stored video data retrieved for playback from a managed server.

2. Background of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Since the introduction of the first personal computer ("PC") over 20 years ago, technological advances to make PCs more useful have continued at an amazing rate. Microprocessors that control PCs have become faster and faster, with operational speeds eclipsing the gigahertz (one billion operations per second) and continuing well beyond.

Productivity has also increased tremendously because of the explosion in development of software applications. In the early days of the PC, people who could write their own programs were practically the only ones who could make productive use of their computers. Today, there are thousands and thousands of software applications ranging from games to word processors and from voice recognition to web browsers.

In addition to improvements in PC hardware and software generally, the technology for making computers more useful by allowing users to connect PCs together and share resources between them has also seen rapid growth in recent years. This technology is generally referred to as "networking." In a networked computing environment, PCs belonging to many users are connected together so that they may communicate with each other. In this way, users can share access to each other's files and other resources, such as printers. Networked computing also allows users to share internet connections, resulting in significant cost savings. Networked computing has revolutionized the way in which business is conducted across the world.

Not surprisingly, the evolution of networked computing has presented technologists with some challenging obstacles along the way. One obstacle is connecting computers that use different operating systems ("OSes") and making them communicate efficiently with each other. Each different OS (or even variations of the same OS from the same company) has its own idiosyncrasies of operation and configuration. The interconnection of computers running different OSes presents significant ongoing issues that make day-to-day management of a computer network challenging.

Another significant challenge presented by the evolution of computer networking is the sheer scope of modern computer networks. At one end of the spectrum, a small business or home network may include a few client computers connected to a common server, which may provide a shared printer and/or a shared internet connection. On the other end of the spectrum, a global company's network environment may require interconnection of hundreds or even thousands of computers across large buildings, a campus environment, or even between groups of computers in different cities and countries. Such a configuration would typically include a large number of servers, each connected to numerous client computers.

Further, the arrangements of servers and clients in a larger network environment could be connected in any of a large number of topologies that may include local area networks ("LANs"), wide area networks ("WANs") and municipal area networks ("MANs"). In these larger networks, a problem with any one server computer (for example, a failed hard drive, failed network interface card or OS lock-up to name just a few) has the potential to interrupt the work of a large number of workers who depend on network resources to get their jobs done efficiently. Needless to say, companies devote a lot of time and effort to keeping their networks operating trouble-free to maximize productivity.

An important aspect of efficiently managing a large computer network is to maximize the amount of analysis and repair that can be performed remotely (for example, from a centralized administration site). Tools that facilitate remotely analyzing and servicing server problems help to control network management costs by reducing the number of network management personnel required to maintain a network in good working order. Remote server management also makes network management more efficient by reducing the delay and expense of analyzing and repairing network problems. Using remote management tools, a member of the network management team may identify problems and, in some cases, solve those problems without the delay and expense that accompanies an on-site service call to a distant location.

Remote management tools can communicate with a managed server using either (1) in-band communication or (2) out-of-band communication. In-band communication refers to communicating with the server over a standard network connection such as the managed server's normal Ethernet connection. In-band communication with the server is, accordingly, only possible when the server is able to communicate over its normal network connection. Practically speaking, this limitation restricts in-band communication to times when the OS of the managed server is operational (online).

Out-of-band communication, which is not performed across the managed server's normal connection to the network, is a much more powerful tool for server management. In out-of-band communication, a "back door" communication channel is established by a remote server management tool (such as a remote console or terminal emulator) using some other interface with the server (such as (1) through the server's modem, (2) via a direct connection to a serial port, (3) through an infrared communication port, or (4) through an Ethernet interface or the like).

In a sense, out-of-band communication is like opening an unobtrusive window through which the inner workings of the operation of the managed server may be observed. After the out-of-band communication link with the server is established, the remote server management tool communicates with the server to obtain data that will be useful to analyze a problem or potential problem. After a problem has been analyzed, out-of-band communication may be possible to control the managed server to overcome the problem or potential problem.

In addition to the distinction between in-band and out-of-band communication with a managed server, another important distinction is whether the managed server is online or offline. The term "online" refers to a managed server in which the OS is up and running. The managed server is said to be "offline" if its OS is not up and running. For the purpose of explaining the present technique, communications with a managed server will take place in one of these four states: (1) in-band online; (2) in-band offline; (3) out-of-band online; and (4) out-of-band offline.

An important goal in the development of remote server management tools is to increase the number of server problems that may be analyzed and repaired remotely (that is, without requiring direct, on-site intervention by a member of the network management team). To facilitate that goal, it is highly desirable to have a network management tool that is able to capture the maximum amount of information from a managed server in the maximum range of operational states of the server (for example, not powered up, fully operational or powered but locked up) and to allow control of the managed server based on that data.

Early remote management tools were able to analyze and address a relatively narrow range of managed server problems. One of the first remote server management tools had the ability to reset a managed server remotely by cycling power to turn the server off and on again via an out-of-band communication session over a phone line. In this way, a managed server could be reset whether in an online or offline condition. This tool, however, did not have the ability to assimilate data about the operation of the managed server or to analyze the cause of the managed server's failure. Accordingly, the principal utility of these early server management tools was to reset the managed server after catastrophic failure. These management tools were not useful for diagnosing subtle problems or preventing future failures.

Later server management tools employed proprietary software agents similar to device drivers to monitor a wide range of conditions in the managed server directly (for example, alerts and management parameters specified by the Simple Network Management Protocol ("SNMP")). The proprietary software agents in these management tools were designed to pass their data to the OS of the managed server, where it could be retrieved by remote access such as a remote management console application.

The large amount of data accessible by these management tools made them useful for diagnosing the cause of a wide range of server failures and permitting repair of those failures. A shortcoming of these server management tools, however, is that they rely primarily on communication between the managed server's OS and proprietary software agents that monitor conditions in the managed server. This limitation means that the tool is only operational when the managed server is online. Server management tools of this type are, accordingly, of little use in correcting problems in a managed server that is offline.

A still later generation of server management tools relied on a dedicated add-in card comprising an independent processor, memory, and battery backup. The add-in card essentially provided a dedicated management computer for monitoring and controlling the managed server. The dedicated management computer was hosted in the managed server and could communicate with the managed server (host) through an existing communication interface (for example, the PCI bus of the managed server).

Such remote management tools could additionally include software agent-based data gathering capability of the type used in earlier agent-based systems previously discussed. In this way, these remote management solutions combine the advantages of deep information gathering capability (software agent-based information gathering technology available when the OS of the managed server is online) with the ability to control the operation of the managed server independently via an out-of-band communication session using the dedicated server management computer system hosted in the managed server.

The add-in card type of remote management tool could also include the capability to capture video data and reset sequences from the managed server for remote display or replay at a later time. The capture of video data is facilitated by the close integration of a remote management tool with the managed server and the ability of the remote management tool to communicate with the managed server over existing communication links (such as an industry standard PCI bus). The ability of a remote management tool to capture video data from a managed server is a particularly powerful analysis tool because it lets a remote user have "virtual access" to the managed server, just as if the user was physically present and inspecting the managed server in person.

The video image and reset sequence data is potentially useful in analyzing the causes of failure in the managed server. A file collecting the video data could be updated whenever a change in the appearance of the video data was detected. This file could be replayed at a later time to allow a knowledgeable individual or team to analyze potential and actual problems with the managed server based on the video data captured by a remote server management tool.

In a typical remote management system employing a dedicated server management computer on an add-in card, a user (typically, a member of the network management team) could initiate an out-of-band session with the dedicated server management computer hosted in the managed server via a remote console application program being executed on a client computer. The dedicated management computer could be addressed by the user to control various aspects of the operation of the managed server via control circuitry connected to the embedded server management computer hosted by the managed server.

During a remote management communication session, the user could replay the file that stored video data gathered from the managed server by the remote server management tool. In this manner, a remote user could see the images in a manner similar to how they would have appeared on a video monitor connected to the managed server at the time the data was gathered. The image data could not, however, be viewed in a temporally accurate manner because the data was gathered based on changes to the image data only. From the playback of that data, it would be difficult or impossible to tell how long a given image had been displayed before it was subsequently updated. The playback of data in that manner could result in unnatural gaps between captured events or incomprehensibly fast output, even in the same recorded stream.

In order to play back the recorded data such that rapidly changing sections were comprehensible, the user would have to wait through less rapidly changing sections of the playback. If, on the other hand, the playback speed was set high enough to comfortably review less rapidly changing sections, other sections would quickly "fly by" and might even scroll off the screen before the user could comprehend the output.

BRIEF DESCRIPTION OF THE DRAWINGS

The foregoing and other advantages of the invention will become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
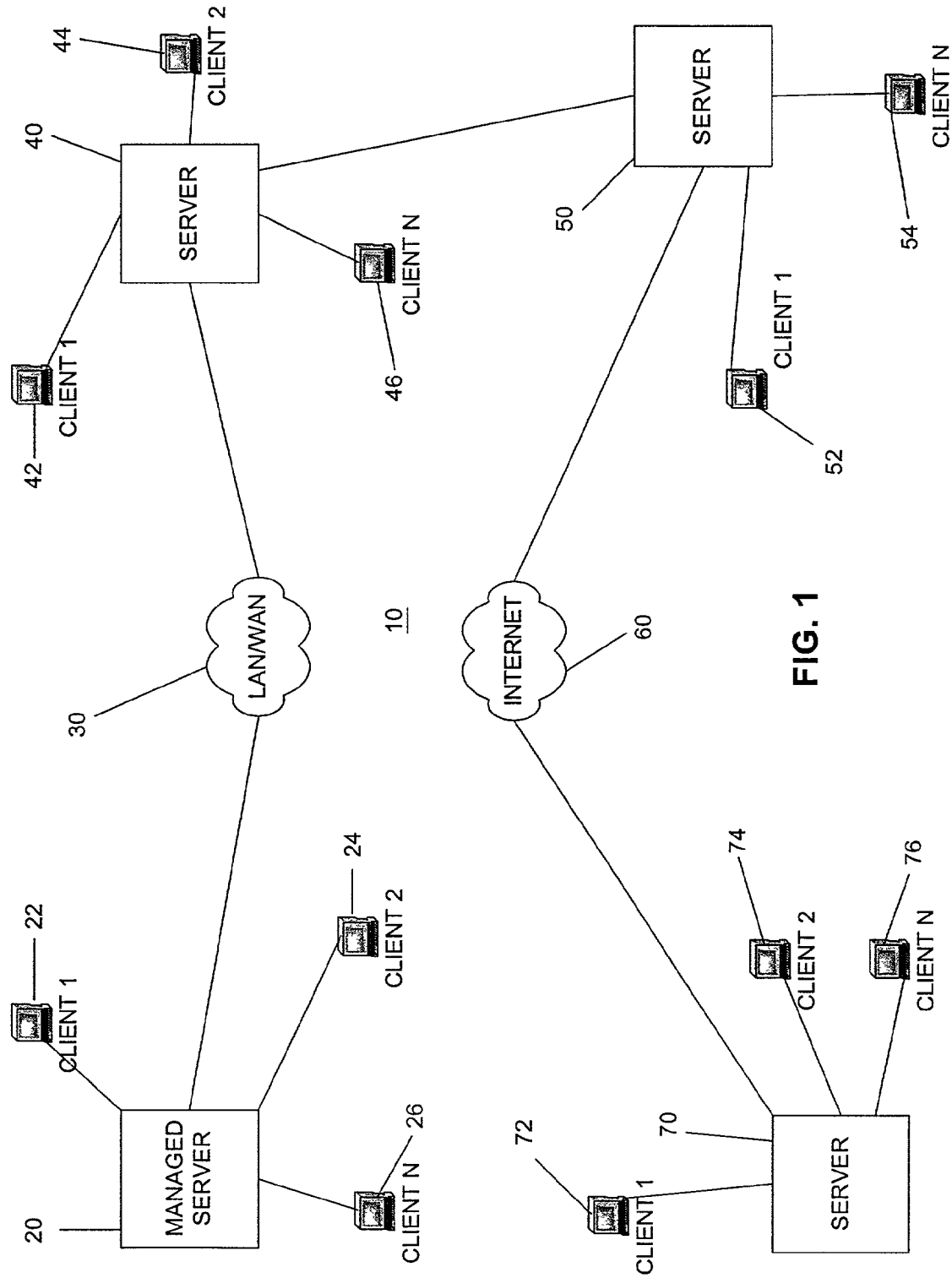
FIG. 1 is a block diagram illustrating an exemplary computer network system in which a remote server management controller of the present invention may be practiced.

Turning now to the drawings and referring initially to FIG. 1, a block diagram of an exemplary computer network system in which the present invention may be practiced is illustrated and designated using a reference numeral 10. The computer network 10 is intended to illustrate a typical modern computer network configuration with all its complexities and flexibility. A managed server 20 is connected to a plurality of client computers 22, 24 and 26. For purposes of explaining the present embodiment clearly, only one server on the network 10 has been designated as a "managed server." In practice, those of skill in the art will appreciate that the any or all of the servers in the network 10 could simultaneously include hardware and software devised according to the invention, making those servers "managed servers" as well.

The managed server 20 may be connected to as many as n different client computers. The magnitude of n is a function of the computing power of the managed server 20. If the managed server has large computing power (for example, faster processor(s) and/or more system memory) relative to other servers on the network, it will be able to effectively serve a relatively large number of client computers.

The managed server 20 is connected via a typical network infrastructure 30, which may consist of any combination of hubs, switches, routers and the like. While the network infrastructure 30 is illustrated as being either a local area network ("LAN") or wide area network ("WAN"), those skilled in the art will appreciate that the network infrastructure 30 may assume other forms such as a municipal area network ("MAN") or even the Internet.

The network infrastructure 30 connects the managed server 20 to server 40, which is representative of any other server in the network environment of managed server 20. The server 40 may be connected to a plurality of client computers 42, 44 and 46. The server 40 is additionally connected to server 50, which is in turn connected to client computers 52 and 54. The number of client computers connected to the servers 40 and 50 is dependent only on the computing power of the servers 40 and 50, respectively.

The server 40 is additionally connected to the Internet 60, which is in turn connected to a server 70. Server 70 is connected to a plurality of client computers 72, 74 and 76. As with the other servers shown in FIG. 1, server 70 may be connected to as many client computers as its computing power will allow.

Those skilled in the art will appreciate that neither the exact topology of the network illustrated in FIG. 1 nor the protocol of network communication (for example, Ethernet or any number of other common protocols) is a crucial aspect of the present invention. Moreover, the network topology shown in FIG. 1 is hypothetical and is shown only to explain the present invention with greater clarity by giving an example of a network environment in which the present invention is useful.

As explained in detail below, the present invention is illustrated as being deployed in a remote server management controller by way of example. The exemplary remote server management controller may be hosted in the managed server 20. The exemplary remote server management controller may be accessed via a remote console application program (or browser program) running on any of the client computers shown in FIG. 1.

Figure 2:
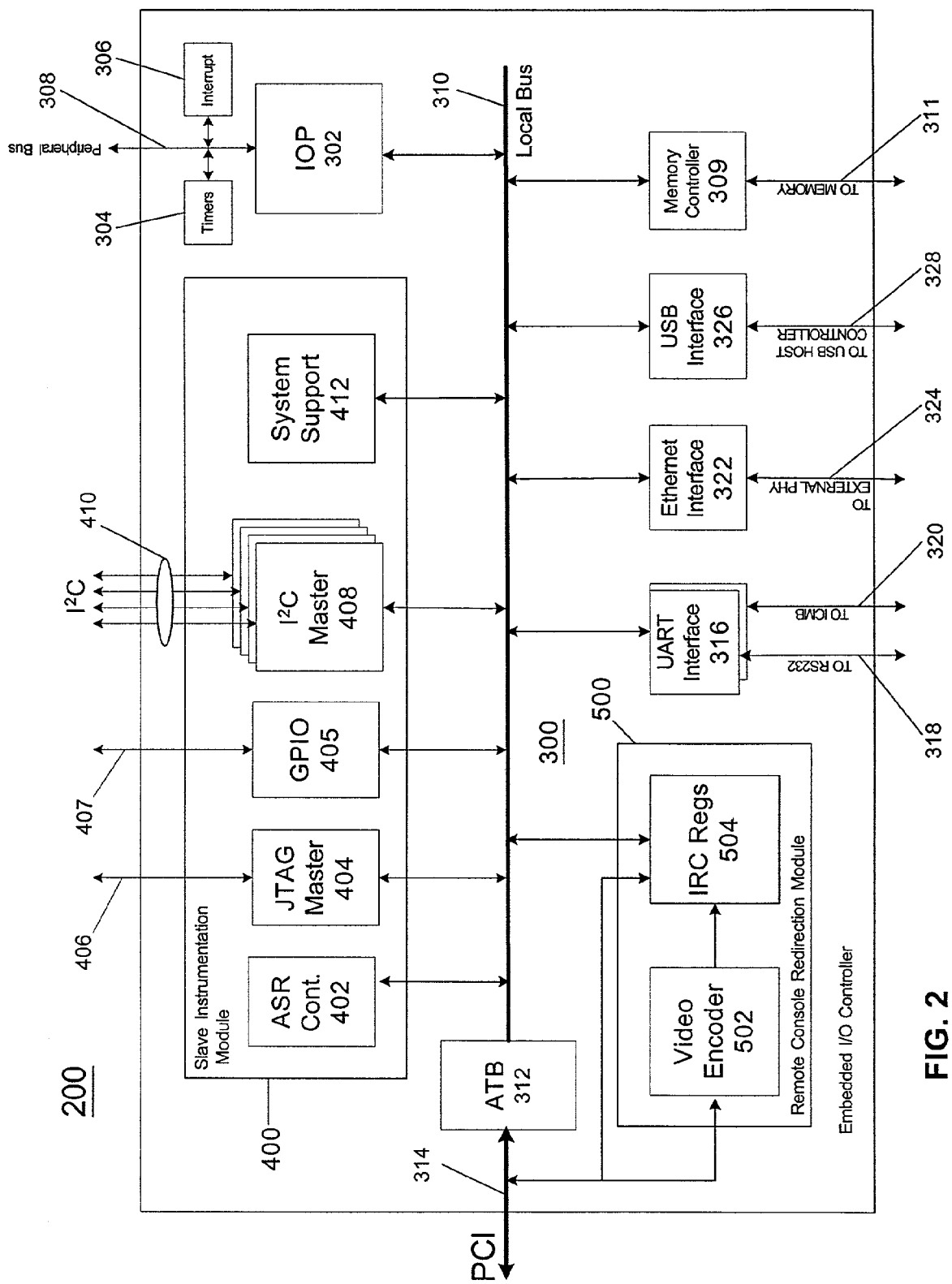
FIG. 2 is a functional block diagram of an exemplary embodiment of a remote server management controller constructed according to the present invention.

FIG. 2 shows a functional block diagram of one exemplary embodiment of a remote server management controller 200 constructed according to the present invention. The remote server management controller 200 may be implemented in a single application specific integrated circuit ("ASIC"). Alternatively, the remote server management controller 200 may be implemented in a plurality of integrated circuits or discrete components. Those skilled in the art will appreciate that implementation details such as deciding which functional aspects of remote server management controller 200 are implemented in a single ASIC or different ASICs are matters of design choice and not crucial aspects of the present invention.

For purposes of describing the invention clearly, the remainder of this description is written assuming that the remote server management controller 200 is implemented in a single ASIC incorporated into the motherboard of the managed server 20 (FIG. 1). Additionally, any of the client computers shown in FIG. 1 (whether connected directly to managed server 20 or to servers 40, 50 or 70) may establish communication with the remote server management controller 200 through its network connection as is more fully described below. Users may further interface with the remote server management controller 200 through additional communications interfaces such as a modem or other externally available serial connection such as a UART.

The remote server management controller 200 may be implemented so that it is powered and capable of operation whether or not the managed server 20 (FIG. 1) is powered up (turned on) or online. Powering the remote server management controller 200 regardless of whether the host managed server is turned on allows the remote server management controller 200 to monitor, analyze and potentially intervene to correct the widest possible range of system problems that may befall the managed server 20 (FIG. 1).

The logic of the remote server management controller 200 is broken down into three main functional blocks. The first of these three functional blocks is an embedded I/O controller 300, which is essentially an independent computer system that is integrated within the managed server 20 (FIG.

1). The second and third functional blocks of the remote server management controller 200 are a slave instrumentation module 400 and a remote console redirection module 500. As described below, the embedded I/O controller 300 monitors and controls a wide range of conditions in the managed server 20 via the slave instrumentation module 400 and the remote console redirection module 500.

The embedded I/O controller 300 comprises an Input/Output processor ("IOP") 302, which provides general control and functions as a management processor for the remote server management controller 200. The IOP 302 may be implemented as a 32-bit RISC processor, but other processor implementations may be employed as well. The IOP 302 is operatively coupled to a timer module 304 and an interrupt controller 306 via a peripheral bus 308.

In one exemplary embodiment of the invention, a memory controller 309 is operatively coupled to the internal local bus 310. The memory controller 309 is, in turn, operatively coupled to dedicated memory via a memory interface 311. The dedicated memory may be battery-backed SRAM, SDRAM, ROM, NVRAM or any other appropriate type of memory.

The IOP 302 (located in the embedded I/O controller 300) is operatively coupled to the other functional modules (and many sub-modules) of the remote server management controller 200 via an internal local bus 310. Those of ordinary skill in the field will appreciate that the internal local bus 310 exists to allow communication between and among the logical components of the remote server management controller 200. The implementation details of the internal local bus 310 are a matter of design choice and not a crucial aspect of the present invention.

An address translation and bridging ("ATB") unit 312 is operatively coupled to the internal local bus 310 and to a PCI bus 314. PCI bus 314 is integral within and operatively coupled with the managed server 20 (FIG. 1). Preferably, the PCI bus 314, which serves as the main communication interface between the managed server 20 (FIG. 1) and the remote server management controller 200, may be configured as a 32-bit, 33 MHz PCI master/slave interface. In a typical system implementation, the remote server management controller 200 resides on the "compatibility" segment of PCI bus 314, but the PCI bus segment on which the remote server management controller is disposed is not a crucial aspect of the invention. The ATB unit 312 is constructed to allow the remote server management controller 200 to decode bus cycles on the PCI bus 314 and to communicate over the PCI bus 314 by initiating PCI bus cycles.

The remote server management controller 200 may be adapted to snoop video traffic via PCI bus 314. Additionally, the PCI bus 314 provides sufficient bandwidth to allow the remote server management controller 200 to actively procure graphical video data as well as textual video data. Although other protocols could be used for the main interconnect between remote server management controller 200 and managed server 20 (FIG. 1), PCI bus 314 is typically used instead of other slower interfaces such as ISA or LPC because the PCI bus 314 allows the transfer of much greater quantities of data. The remote server management controller 200 is capable of independent operation even if the PCI interface 314 is not operational because of a problem with managed server 20 (FIG. 1).

The embedded I/O controller 300 provides a plurality of communication interfaces that can be employed to establish out-of-band communication sessions with the remote server management controller 200. One such communication interface is a UART interface module 316, which is operatively coupled to internal local bus 310. The exemplary UART interface module 316 comprises two standard 16550 UARTs, each of which may provide a separate serial communication interface between the remote server management controller 200 and the external world. Both UARTs are mapped into the address space of the IOP 302 and can be accessed via PCI bus 314 or by the IOP 302. Either UART may be implemented so that it can be reset through a control register in the address space of the IOP 302.

Outputs from the UART interface module 316 are typically routed to transceivers (not shown), where they may be converted into a wide variety of serial interface types. Examples of the types of serial interfaces that may be provided by the UART interface module 316 are a standard RS-232 interface 318 or an interface that complies with the Intelligent Chassis Management Bus ("ICMB") specification promulgated by Intel Corporation (ICMB interface 320). Those of ordinary skill in the field will appreciate that the RS-232 interface 318 may be used to connect to a wide range of industry standard modems, terminal servers and the like.

In one exemplary embodiment, the RS-232 interface 318 and/or the ICMB interface 320 are accessible to a user from the external chassis of the managed server 20 (FIG. 1). A user may, accordingly, use an external communication device to engage in an out-of-band communication session with the remote server management controller 200 via the UART interface 318 or the ICMB interface 320.

Embedded I/O controller 300 further comprises an Ethernet interface 322, which is operatively coupled to the internal local bus 310. The Ethernet interface 322 provides the main external communication interface between the remote server management controller 200 and the outside world. In the exemplary embodiment shown in FIG. 2, the integrated portion of the Ethernet interface 322 includes a MAC (Media Access Controller), inbound and outbound FIFOs and a DMA engine to automatically transfer packets to and from memory. The Ethernet interface 322 requires a connection via interface 324 to an external PHY (not shown) and typical magnetic coupling to couple the PHY to the wire that serves as the transmission media.

Those skilled in the art will appreciate that a user may connect remotely to the remote server management controller 200 via the Ethernet interface 322. Such a connection may be made, for example, using a remote console application running on a client computer anywhere on the network that includes managed server 20 (FIG. 1). The user may, thus, engage in out-of-band communication with the remote server management controller 200 for the purpose of diagnosing, correcting and/or preventing problems with the managed server 20 (FIG. 1).

Embedded I/O controller 300 further comprises a USB interface 326, which is operatively coupled to the internal local bus 310. The USB interface 326 is connected to a USB host controller (not shown) via a USB host controller interface 328. In one exemplary embodiment of the invention, the USB interface 326 is connected to one port of a USB host controller, which is typically located in a south bridge portion of the chipset of the managed server 20 (FIG. 1). When implemented in this way, the IOP 302 of the remote server management controller 200 may establish "virtual USB peripherals" that will be seen and recognized by any USB-aware OS or properly adapted system BIOS. These virtual peripherals may be presented to any USB-aware OS to allow communication with the OS in a common, OS-independent manner.

The second major functional block of the remote server management controller 200 is the slave instrumentation module 400. The primary purpose of the slave instrumentation module 400 is to provide the hardware infrastructure to implement control and monitoring functions in the managed server 20 (FIG. 1) as dictated by the IOP 302 in conjunction with dedicated application software such as remote console management software running on a client computer.

The slave instrumentation module 400 comprises an automatic server recovery ("ASR") controller 402, which operates to automatically respond to catastrophic failures of the managed server 20 (FIG. 1). The ASR controller 402 is operatively coupled to the internal local bus 310. The ASR controller 402 continually monitors whether the OS of the managed server 20 (FIG. 1) is operational by controlling a dead-man timer that requires periodic servicing by the OS. If the OS of the managed server 20 (FIG. 1) does not service the dead-man timer within a predetermined time, the ASR controller 402 resets the processor of the managed server 20 (FIG. 1) causing the managed server 20 (FIG. 1) to reboot.

A general purpose input/output module ("GPIO") 405 is provided in the exemplary embodiment of the slave instrumentation module 400. The GPIO provides a versatile communication interface that may be used for a wide variety of purposes.

The slave instrumentation module 400 also comprises a JTAG master 404. The JTAG master 404 is operatively coupled to the internal local bus 310. The JTAG master 404 comprises a standard JTAG interface 406, which is operatively coupled to a corresponding standard JTAG interface (not shown) on the motherboard of the managed server 20 (FIG. 1). Through the JTAG master 404, the remote server management controller 200 can perform a wide range of control functions on the managed server 20 (FIG. 1). These functions include updating or repairing the BIOS of the managed server 20 by reprogramming the non-volatile memory where the BIOS resides.

The slave instrumentation module 400 further comprises an I²C master 408, which is operatively coupled with the internal local bus 310. The I²C master 408 has the capability of controlling a plurality of independent I²C serial channels 410. For purposes of example only, four (4) separate I²C channels are shown in FIG. 2. The I²C master 408 comprises a separate I²C engine for controlling each separate I²C channel.

The slave instrumentation module 400 additionally comprises a block of system support logic 412. The system support logic 412 is operatively coupled to the internal local bus 310. The system support logic 412 provides a variety of housekeeping and security functions for the managed server 20. Examples of these functions include providing the EISA bus ID, flash ROM support, ECC support, hot spare boot support, system post monitor support, floppy write protect, SMI base security measures, open hood detection and the like.

The remote console redirection module may snoop the PCI bus 314 and capture video data intended to be displayed via a video controller that is also disposed on the PCI bus 314 (see discussion of FIG. 3 below) of the managed server 20 (FIG. 1). The PCI bus 314 provides sufficient bandwidth to allow the IOP 302 to procure graphical video data as well as textual video data. In the exemplary embodiment of the invention, the video encoder 502 has the capabilities of determining when the video information destined for the video controller represents a change from the previous image data and storing the video image data snooped from the PCI bus 314 in a compressed manner.

Figure 3:
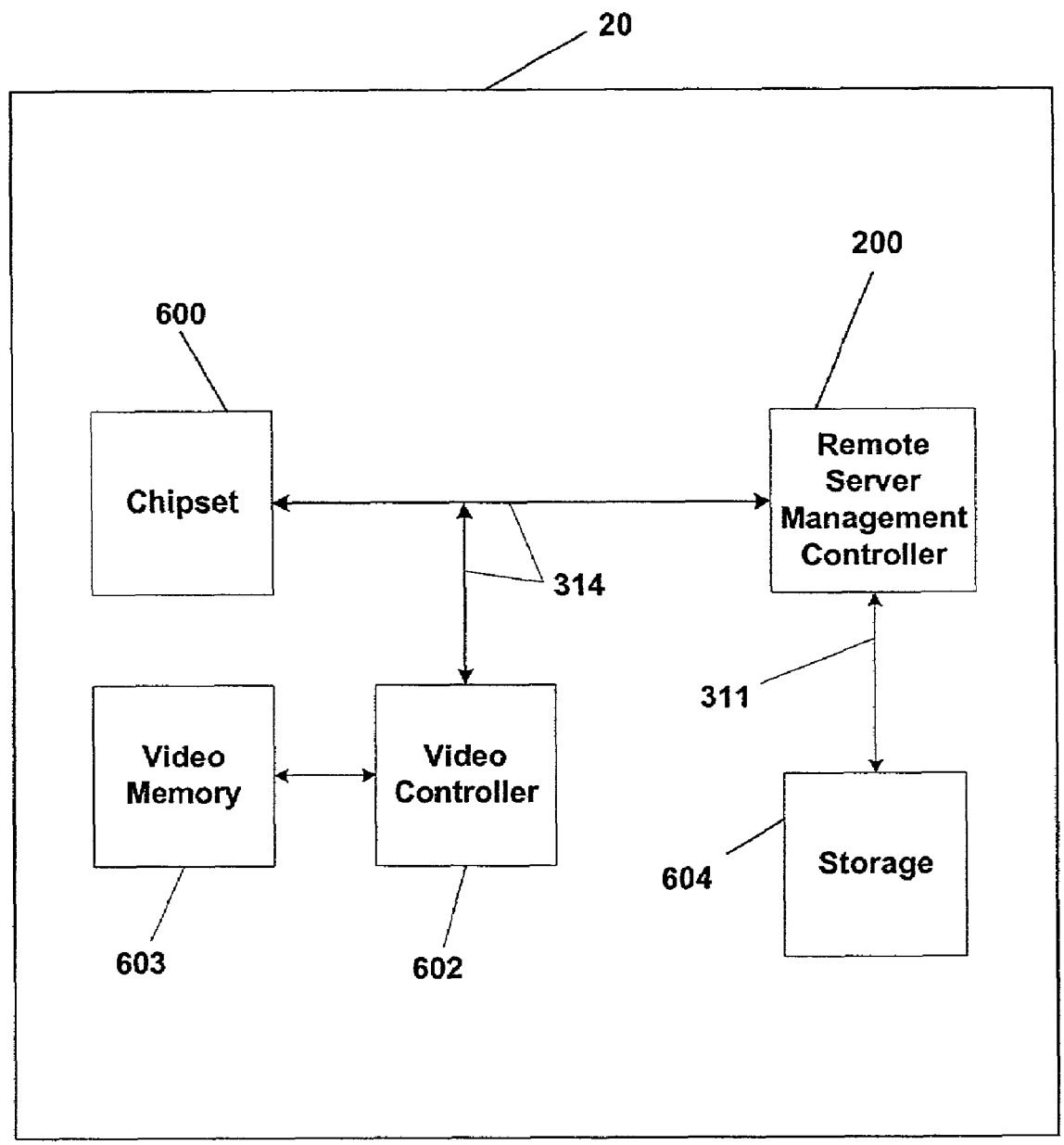
FIG. 3 is a block diagram showing an exemplary embodiment of an operating environment of a remote server management controller in a managed server.

FIG. 3 is a block diagram showing an exemplary embodiment of an operating environment of the remote server management controller 200 in the managed server 20. The remote server management controller 200 is connected to a chipset 600 via the PCI bus 314. The chipset 600 provides typical support functions for the central processing unit (not shown) of the managed server 20.

The remote server management controller 200 is also connected in a manner well known to those of ordinary skill in the art to a storage device 604. In the exemplary embodiment, the storage device 604 is a part of the memory associated with the remote server management controller 200, and is connected via the memory interface 311. Alternatively, the storage device may comprise a disk drive, floppy drive, CD-R drive, CD-R/W drive, memory stick, or any other type of device that is capable of storing data.

The remote server management controller 200 and the chipset 600 are connected via the PCI bus 314 to a video controller 602. As set forth above, the remote server management controller 200 may snoop or eavesdrop on the PCI bus 314 to capture data that is sent to the video controller 602 for display on a monitor (not shown) typically connected thereto. The remote server management controller may additionally access the video memory 603 of the video controller to retrieve data stored there. Video data captured by the remote server management controller 200 may be transferred for display to a remote user in real time or it may be stored for later display on the storage device 604.

The exemplary embodiment of the remote server management controller 200 has enough speed and computing power to capture graphical video data in addition to textual video data. The remote server management controller 200 may additionally store other conditions of the managed server to which it has access. For example, the status of various system LEDs that are displayed on the server chassis can be stored for accurate temporal replay according to the present invention.

The IOP 302 of the remote server management controller 200 may be programmed to capture and store video data or other data (collectively, "recorded server event data") in response to a wide variety of events. For example, recording of recorded server event data may be initiated when the managed server 20 is booted and executes a power-on system test ("POST"). Alternatively, the IOP 302 (FIG. 2) of the remote server management controller 200 (FIG. 2) could be programmed to capture and store recorded server event data in response to interrupts or software commands. The storing of recorded server event data could be initiated when the managed server 20 is reset by the ASR controller 402. The storage of recorded server event data can be initiated by virtually any event that the remote server management controller 200 (FIG. 2) is capable of detecting, including events external to the remote server management controller 200 (FIG. 2).

The duration during which recorded server event data is stored after an initiating event may be programmed to be any desired length of time. The time period could be fixed (for example, five minutes). Alternatively, the time period may be for the duration of some event (for example, the duration of system POST). Additionally, the recording time period may be governed by the amount of storage available for this feature in the attached storage device 604. The amount of storage available may be predetermined by a user.

Recorded server event data may be stored in response to multiple triggering events. To accomplish this, the remote server management controller 200 may allocate storage on the attached storage device 604 to accommodate multiple captured server event data sequences. For example, the remote server management controller 200 may be programmed to record event data every time the managed server executes a POST (a "last boot sequence") and at the same time be programmed to initiate a recording sequence associated with a failure and/or recovery of the managed server 20.

Figure 4:
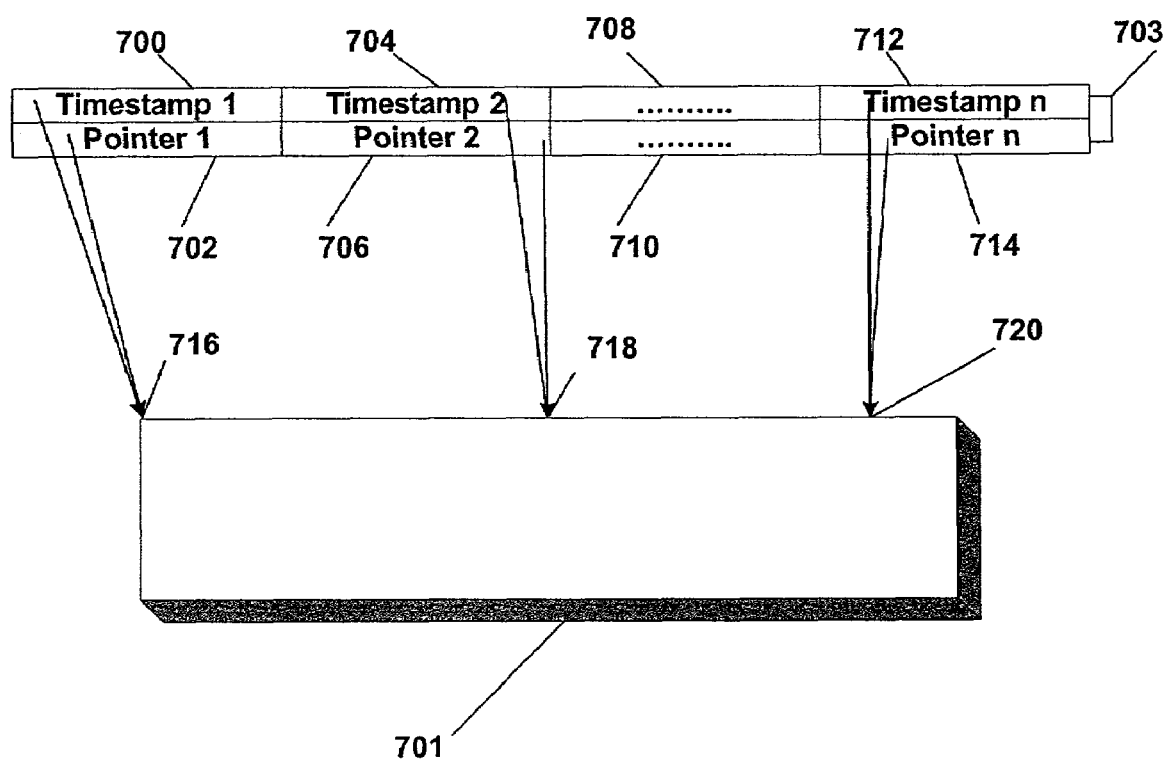
FIG. 4 is a graphical representation of an exemplary data structure for storing video data for playback according to the present invention.

FIG. 4 is a graphical representation of an exemplary data structure for storing video data according to the present invention. In an exemplary embodiment of the present invention, a recorded event data file 701 is stored as a continuous stream of recorded server event data, such as video data, that is intended to be displayed by the video controller 602 (FIG. 3) or other devices of the managed server 20 (FIG. 3). The remote server management controller 200 begins storing video data in the recorded event data file 701 in response to a predetermined initiating event.

The remote server management controller 200 also stores timestamp data and location pointer data corresponding to specific points in the image data in the recorded event data file 701. The timestamp and pointer data is used when the corresponding video data is replayed to make the playback of the data appear as it would have at the time the events depicted in the stored video data actually occurred. Playback of data in this temporally accurate manner helps network administrators to accurately diagnose failures that occur in the managed server because they can see how long monitored events actually took.

In the exemplary embodiment, recorded server event data may be stored according to at least two different strategies. First, recorded server event data may be stored after an initiating event until the space allocated on the storage device 604 for that particular type of stored event data is filled. Second, recorded server event data may be stored continuously in anticipation of a concluding event, such as a failure of the managed server 20. In the second strategy, the allocated space for recorded server event data on storage device 604 is continuously overwritten, so that the allocated space always contains the most recently recorded server event data. In this case, the timestamp and pointer data stored in recorded event data file 701 is analyzed to systematically allow overwriting of the appropriate amount of data in the storage space allocated on storage device 604.

In the exemplary embodiment, a timestamp and a pointer are recorded to memorialize changes in the recorded event data being monitored. Not every change in the recorded event data is memorialized by a timestamp and pointer. Instead, timestamps and pointers are recorded for changes that take place after a predetermined time with respect to previous change. In other words, a timestamp-pointer pair is only recorded in the recorded event data file 701 for changes that occur after longer than a predetermined time with respect to the previous change, which is memorialized by the previous timestamp-pointer pair.

Each timestamp contains a time value that uniquely corresponds to a location in the recorded event data file 701. A timestamp 700 corresponds to an event data sample 716, which represents the current start of the event data file 701. A pointer 702 that corresponds to the event data sample 716 is also stored by the remote server management controller 200. The pointer, which acts as an index into the recorded event data file 701, may be used to determine information such the number of stored bytes of data contained between consecutive timestamp-pointer pairs. The pointer, in conjunction with the timestamp, may be used to determine the elapsed time between the current timestamp-pointer pair and the previous timestamp-pointer pair. The image represented by the event data sample 716 could include textual elements, graphical elements or both.

A timestamp 704 and a pointer 706 correspond to an event data sample 718 in the recorded event data file 701. A plurality of timestamps 708 and corresponding pointers 710 each represent specific points in the recorded event data file 701. A timestamp 712 and a pointer 714 correspond to an event data sample 720 in the recorded event data file 701. The timestamps 708 and pointers 710 are shown in FIG. 4 to illustrate that the specific number of timestamps and pointers stored may vary. Those of ordinary skill in the art will appreciate that the timestamps, pointers and event data represented in FIG. 4 may be stored in a single file or sequence or in different files or sequences on the storage device 604 for playback at a later time.

Timestamps 700, 704, 708 and 712 and pointers 702, 706, 710 and 714 are stored so that they can be used later to index into the stream of stored event data in the recorded event data file 701 and display that data in a temporally accurate manner. Each of the timestamps and corresponding pointers are created because the event data they correspond to has changed from a previous state. In the exemplary embodiment shown in FIG. 4, the collection of timestamps and corresponding pointers (referred to generally by reference numeral 703) are stored because each timestamp/pointer pair corresponds to changes in event data that occurred longer than a predetermined relative time period after the preceding change in the event data occurred.

The exact number of timestamp-pointer pairs varies depending on the total amount of recorded data, number of discrete pauses in the recorded data and other factors. By storing timestamp-pointer pairs in this manner, the illustrated embodiments allow quantization of recorded data using a relatively small collection of timestamp-pointer pairs.

The timestamp-pointer pair storing arrangement of the illustrated embodiments allows distinct visual events are grouped together. In one embodiment, changes to event data that happen in less then the predetermined relative time period with respect to the previous change have no timetamp-pointer pair associated therewith, but are instead treated as being merged into the previous event data sample.

In the exemplary embodiment, only timestamp/pointer pairs are stored in the collection 703 if the timestamp/pointer pair corresponds to event data that represents a change that occurred in greater than a predetermined relative time period after the previously recorded event data. Alternatively, timestamp/pointer pairs corresponding to event data that represents any change to previous event data may be stored (regardless of how long the change took place with respect to the preceding change). In such an embodiment, the collection of all timestamp/pointer pairs may be sorted or merged to produce a collection of timestamp/pointer pairs that represent only the changes in video data that occurred after the predetermined relative time period.

The value of the predetermined relative time period may be selected based upon several factors. As the duration of the predetermined relative time period increases, more data will be merged together in each event data sample that will be used for later replay and the more temporal information is discarded. Changes that occur within a time smaller than the predetermined time period will be replayed as continuous in time, discarding the temporal difference between the two events. As the duration of the predetermined relative time period increases, fewer entries will be stored in the collection of timestamp/pointer pairs 703 for a given time period.

As the duration of the predetermined relative time period gets shorter, fewer events will be merged together in each video data element and the more temporal information is preserved. As the duration of the predetermined relative time period gets shorter, more event data elements will be used for later replay and more entries will be made in the collection of timestamp/pointer pairs (703).

A value for the predetermined relative time period may be chosen such that each associated element of event data corresponding thereto tends to accurately represent a particular stored event. For example, the stored event may represent video information associated with the drawing of a dialog box by the CPU of the managed server 20 for display by the video controller 602 (FIG. 3). To draw the dialog box properly, the CPU may transfer one or more drawing commands and/or images to the video controller 602 (FIG. 3). Multiple video drawing operations may be required, but all these operations typically occur within a relatively small amount of time with respect to each other because they are part of the same video event (draw a dialog box).

The remote management controller 200 may observe one or more changes to the video controller 602 (FIG. 3), but the remote server management controller 200 may not be privy to the high-level functions (such as the drawing a dialog box) performed by the CPU of the managed server 20. Accordingly the remote server management controller 200 may not have information to determine that the original video event is the drawing of a dialog box. In order to maintain its independence from the OS of the managed server 200, the remote server management controller 200 may only see the effect of the video event (individual drawing commands), not the source of the video event (the dialog box). The predetermined relative time period may be chosen to group one or more detected video changes into a event data set represented by a particular timestamp/pointer pair 703. As such, the video changes are grouped together and replayed together in time so that, in this example, the complete dialog box is displayed together during playback without the results of the intermediate steps of the individual drawing commands executed by the CPU of the managed server 20.

In addition to the previously described strategy for storing timestamp-pointer pairs, the remote server management controller 200 may be programmed to insert a timestamp-pointer pair periodically at random or regular time increments. Such timestamp-pointer pairs may help to ensure proper visual synchronization during playback.

In addition to changes in video data only, the recorded event data file 701 may also be constructed to contain event data corresponding to any event monitored by the remote server management controller 200. An example of such event data is the status of an LED on the chassis of the managed server 20 (FIG. 1). This data can be placed in the video data stream sent to the video controller 602 (FIG. 3) with appropriate identification tags so that it can be distinguished from video data during playback. Those of ordinary skill in the art will appreciate that numerous identification mechanisms may be used. The specific identification mechanism is not a crucial aspect of the invention.

In the exemplary embodiment, the time data stored in the timestamp 700 is an absolute time value at which the corresponding video data occurred (as opposed to a time interval that is relative to another data point such as another timestamp). In this way, the timestamp data is directly coupled to a reference clock without collecting and propagating errors from each time interval. The absolute time value stored in the timestamp 700 could be taken from the system clock of the managed server 20 (FIG. 1) or from a time source associated with the IOP 302.

When a user (for example, a remote system administrator) calls for the playback of the stored information, the timestamp 700 and pointer 702 are used to access the event data sample 716 from the recorded event data file 701. The event data sample 716 is displayed to the user for a time period equal to the time difference between the time contained in the timestamp 700 and the time contained in the timestamp 704. At the expiration of that time, the event data sample 718 corresponding to the pointer 706 is displayed for a time equal to the difference between the timestamp 704 and the next successive timestamp. Event data is replayed to the user in this manner until the event data sample 720 corresponding to the pointer 714 and the timestamp 712 is displayed.

The replay of video data in the manner described gives the user the opportunity to view the displayed data as though it were actually happening on the managed server. This allows a remote user to observe the previously recorded data in a manner approximating the way the display appeared in real time, avoiding unnatural gaps or incomprehensibly fast output. The temporally accurate nature of the replay allows the user to observe whether recorded actions took longer (or shorter) than normal. The replayed data, including the timing of displayed actions, helps the user to potentially identify problems with specific components in the managed server 20 (FIG. 1).

For example, the results of a system POST are typically displayed on the screen of the managed server 20 (FIG. 1). The remote server management controller of the present invention may be programmed to store this video data. If the server develops a problem, a remote user can engage the remote server management controller 200 (FIG. 2) in an out-of-band management session and request a replay of video data from the last time the system executed a POST. If a component that is subject to testing during POST is having a problem, it will very likely take a longer than normal period of time to try that portion of the POST before the test moves on to another component. The user who is replaying the video data stored according to the present invention can observe the delay that occurred in testing the slow component and make an informed decision about whether that component could be the cause of problems with the managed server 20 (FIG. 1).

Hard drives attached to the managed server 20 are a prime example of a component that can be quickly analyzed using a temporally accurate replay. If the managed server 20 is offline and cannot be restored to operation through automatic reset mechanisms, a remote user may wish to observe the last reboot attempt to look for possible errors. The remote user notices that the area in POST where the drive is tested and identified took an unusually long time. The drive may be in the process of degrading, which is indicated by the slow spin-up time. The drive, however, may be healthy enough to finish the initialization process and even allow the managed server 20 to partially boot. The remote user may be able to recognize that the hard-drive is in the process of failing, which may explain why the OS did not fully load. Review of the temporally accurate replay sequence gives the remote user key information that may be used to direct further debugging/diagnosing efforts without regard to whether the OS on the managed server 20 (FIG. 1) is fully operational or whether the component being analyzed has completely failed.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A remote server management controller, comprising:
an Input/Output Processor ("IOP"); and
a remote console redirection module that is operatively coupled to the IOP and a communication bus, the remote console redirection module being adapted to:
(a) identify changed video data on the communication bus;
(b) store the changed video data on a storage device;
(c) store a timestamp that comprises a time value that corresponds to changes in video data that occur after a predetermined relative time period with respect to a previous change; and
(d) store a pointer associated with each timestamp, the pointer corresponding to a video image derived from the changed video data; and
wherein the pointer and the timestamp are adapted to be used to construct a real-time sequential reenactment of a video display represented by the changed video data.

2. The remote server management controller of claim 1 wherein the remote console redirection module is adapted to initiate a sequence of capturing and storing video data to construct the real-time sequential reenactment of the video display at a later time in response to a condition external to the remote server management controller.

3. The remote server management controller of claim 2 wherein the condition external to the remote server management controller is the beginning of a user-defined time period.

4. The remote server management controller of claim 2 wherein the condition external to the remote server management controller is the execution of a POST by a managed server associated with the remote server management controller.

5. The remote server management controller of claim 1 wherein the video data comprises data corresponding to a state of an LED on a chassis of a managed server associated with the remote server management controller.

6. The remote server management controller of claim 1 wherein the remote console redirection module is adapted to store the changed video data such that the changed video data represents events that occurred in a most recent predetermined time period.

7. The remote server management controller of claim 1 wherein the video data comprises graphical video data.

8. A managed server, comprising:
a video controller operatively coupled to a communication bus;
a storage device; and
a remote server management controller operatively coupled to the communication bus and the storage device, the remote server management controller comprising:
an IOP; and
a remote console redirection module that is operatively coupled to the IOP and a communication bus, the remote console redirection module being adapted to:
(a) identify changed video data on the communication bus;
(b) store the changed video data on a storage device;
(c) store a timestamp that comprises a time value that corresponds to changes in video data that occurs after a predetermined relative time period with respect to a previous change; and
(d) store a pointer associated with each timestamp, the pointer corresponding to a video image derived from the changed video data; and
wherein the pointer and the timestamp are adapted to be used to construct a real-time sequential reenactment of a video display represented by the changed video.

9. The managed server of claim 8 wherein the remote console redirection module is adapted to initiate a sequence of capturing and storing video data to construct the real-time sequential reenactment of the video display at a later time in response to a condition external to the remote server management controller.

10. The managed server of claim 9 wherein the condition external to the remote server management controller is the beginning of a user-defined time period.

11. The managed server of claim 9 wherein the condition external to the remote server management controller is the execution of a POST by the managed server.

12. The managed server of claim 8 wherein the video data comprises data corresponding to a state of an LED on a chassis of a managed server associated with the remote server management controller.

13. The managed server of claim 8 wherein the remote console redirection module is adapted to store the changed video data such that the changed video data represents events that occurred in a most recent predetermined time period.

14. The managed server of claim 8 wherein the video data comprises graphical video data.

15. A method for storing video data for replay, the method comprising the acts of:
(a) determining when changes occur in the video data;
(b) storing portions of the video data responsive to the act of determining; (
c) storing a timestamp that comprises a time value that corresponds to changes in the video data that occur after a predetermined relative time period with respect to a previous change; and
(d) storing a pointer associated with each timestamp, the pointer corresponding to a video image derived from the changed video data; and
wherein the pointer and the timestamp are adapted to be used to construct a real-time sequential reenactment of a video display represented by the changed video data.

16. The method of claim 15 wherein the act of storing video data takes place for a user-defined time period.

17. The method of claim 15 wherein the act of storing video data takes place in response to the execution of a POST.

18. The method of claim 15, wherein the act of storing video data takes place in response to an automatic server recovery reset.

19. The method of claim 15, further comprising the act of rewriting the changed video data such that the stored changed video data represents events that occurred in a most recent predetermined time period.

20. The method of claim 15 wherein the recited acts are performed in the recited order.

* * * * *